(12) United States Patent
Zhang

(10) Patent No.: US 11,505,278 B2
(45) Date of Patent: Nov. 22, 2022

(54) METHOD AND APPARATUS FOR PROCESSING MOTOR CONTROL SIGNAL, ELECTRIC VEHICLE AND STORAGE MEDIUM

(71) Applicant: NINE INTELLIGENT (CHANGZHOU) TECH CO., LTD., Jiangsu (CN)

(72) Inventor: Shengqiao Zhang, Beijing (CN)

(73) Assignee: NINE INTELLIGENT (CHANGZHOU) TECH CO., LTD., Jiangsu (CN)

( * ) Notice: Subject to any disclaimer, the term of this patent is extended or adjusted under 35 U.S.C. 154(b) by 0 days.

(21) Appl. No.: 16/495,395

(22) PCT Filed: May 8, 2019

(86) PCT No.: PCT/CN2019/085943
§ 371 (c)(1),
(2) Date: Sep. 19, 2019

(87) PCT Pub. No.: WO2020/143138
PCT Pub. Date: Jul. 16, 2020

(65) Prior Publication Data
US 2021/0354780 A1  Nov. 18, 2021

(30) Foreign Application Priority Data

Jan. 7, 2019 (CN) .......................... 201910013695.X

(51) Int. Cl.
*B62M 6/45* (2010.01)
*B62J 45/41* (2020.01)
(Continued)

(52) U.S. Cl.
CPC ............... *B62M 6/45* (2013.01); *B60L 15/20* (2013.01); *B62J 45/41* (2020.02); *B62K 11/00* (2013.01);
(Continued)

(58) Field of Classification Search
CPC . B62M 6/45; B62J 50/22; B62J 45/41; B62H 5/00; B60L 15/20; B62K 11/00; B60R 25/23; G06F 21/31
See application file for complete search history.

(56) References Cited

U.S. PATENT DOCUMENTS 5,690,186 A * 11/1997 Sugioka ................... B60L 58/26
297/195.1
2008/0105483 A1 * 5/2008 Dugas ...................... B62J 27/00
477/27

FOREIGN PATENT DOCUMENTS

CN  101870265 A  10/2010
CN  202213674 U  5/2012
(Continued)

OTHER PUBLICATIONS

JP search report dated May 18, 2021.
(Continued)

*Primary Examiner* — Said Bouziane
(74) *Attorney, Agent, or Firm* — Gang Yu

(57) ABSTRACT

The present disclosure provides a method and an apparatus for processing a motor control signal, an electric vehicle, a storage medium and an electronic apparatus. The method may include: a predetermined operation is detected, wherein the predetermined operation includes that a rider leaves an electric vehicle; and a motor control signal which is input via a speed control component of the electric vehicle is shielded. Through the present disclosure, the problem that the rider of the electric vehicle forgets to press a P gear or fails to activate the P gear successfully to cause the false operation (Continued)

of the speed control component and thus cause a harm to the electric vehicle or a user or a surrounding environment in the related art is solved; and therefore, the vehicle is prevented from being uncontrollable, and the safety of the electric vehicle or the user or the surrounding environment is guaranteed.

18 Claims, 1 Drawing Sheet

(51) Int. Cl.
*B60L 15/20* (2006.01)
*B62K 11/00* (2006.01)
(52) U.S. Cl.
CPC ....... *B60L 2240/12* (2013.01); *B62K 2204/00* (2013.01)

(56) References Cited

FOREIGN PATENT DOCUMENTS

| | | | |
|---|---|---|---|
| CN | 203157742 | U | 8/2013 |
| CN | 103723223 | A | 4/2014 |
| CN | 104149920 | A | 11/2014 |
| CN | 203957889 | U | 11/2014 |
| CN | 204056180 | U | 12/2014 |
| CN | 104443248 | A | 3/2015 |
| CN | 204432405 | U | 7/2015 |
| CN | 204895746 | A | 12/2015 |
| CN | 105460155 | A | 4/2016 |
| CN | 106458285 | A | 2/2017 |
| CN | 106926918 | A | 7/2017 |
| CN | 107444526 | A | 12/2017 |
| CN | 207157415 | A | 3/2018 |
| CN | 207403855 | U | 5/2018 |
| CN | 108423116 | A | 8/2018 |
| CN | 108622296 | A | 10/2018 |
| CN | 109018112 | A | 12/2018 |
| CN | 109850055 | A | 6/2019 |
| DE | 102015202015 | B3 | 5/2016 |
| EP | 3006251 | A1 | 4/2016 |
| JP | 09286374 | A | 11/1997 |
| JP | H11294214 | A | 10/1999 |
| JP | 2003178815 | A | 6/2003 |
| JP | 2009023545 | A | 2/2009 |
| JP | 2011083158 | A | 4/2011 |
| JP | 2013203294 | A | 10/2013 |
| JP | 2017176422 | A | 10/2017 |
| JP | 2018157381 | A | 10/2018 |
| KR | 20090050742 | A | 5/2009 |
| KR | 20130114959 | A | 10/2013 |

OTHER PUBLICATIONS

Corresponding EP Search results dated Dec. 23, 2020.
Corresponding CN Search results dated Jan. 21, 2021.
Corresponding KR application search report dated Nov. 9, 2020.
International Search report for PCT Application No. PCT/CN2019/085943 filed on May 8, 2018, dated Oct. 11, 2019.

* cited by examiner

METHOD AND APPARATUS FOR PROCESSING MOTOR CONTROL SIGNAL, ELECTRIC VEHICLE AND STORAGE MEDIUM

TECHNICAL FIELD

The present disclosure relates to the field of communication, and in particular to a method and an apparatus for processing a motor control signal, an electric vehicle, a storage medium and an electronic apparatus.

BACKGROUND

For a traditional electric vehicle, a P gear is often provided to prevent a speed control component of the electric vehicle from being, triggered falsely to cause an uncontrollable condition of the electric vehicle. However, in actual application, when a user leaves a seat of the electric vehicle, it is possible that the P gear is forgotten to be pressed by the user, or the operation of the user to press the P gear is nonstandard to fail to activate the P gear successfully. As a result, the electric vehicle may speed up by mistake to drive. For example, when the user forgets to press the P gear or fails to activate the P gear successfully, both hands of the user hold a handlebar of the electric vehicle to push the vehicle to move or stand still: and when the speed control component is screwed up by a right hand carelessly, the electric vehicle drives at an excessively high start speed, which may cause a harm to the electric vehicle or the user or a surrounding environment.

Concerning the problem that a rider of the electric vehicle forgets to press the P gear or fails to activate the P gear successfully to cause false operation to the speed control component and thus cause a harm to the electric vehicle or the user or the surrounding environment in the related art, an effective solution hasn't been proposed yet till now.

SUMMARY

The embodiments of the present disclosure provide a method and an apparatus for processing a motor control signal, an electric vehicle, a storage medium and an electronic device to at least solve the problem that a rider of the electric vehicle forgets to press a P gear or fails to activate the P gear successfully to cause false operation of a speed control component and thus cause a harm to the electronic vehicle or a user or a surrounding environment in the related art.

According to one embodiment of the present disclosure, there is provided a method for processing a motor control signal, which may include the following operations: a predetermined operation is detected, wherein the predetermined operation includes that a rider leaves an electric vehicle; and a motor control signal which is input via a speed control component of the electric vehicle is shielded.

In at least one exemplary embodiment, that the rider leaves the electric vehicle is detected may include at least one of the followings: that a bearing state at a predetermined position of the electric vehicle is a predetermined state is detected; and that a kickstand of the electric vehicle has been placed down is detected.

In at least one exemplary embodiment, that the bearing state at the predetermined position of the electric vehicle is the predetermined state is detected may include at least one of the followings: that a press-down pressure acting on a seat cushion of the electric vehicle is smaller than a first preset value is detected; that a press-down pressure acting on a foot rest of the electric vehicle is smaller than a second preset value is detected; that a pressure value of a tire of the electric vehicle is smaller than a third preset value is detected; and that a cadence of a pedal of the electric vehicle is smaller than a fourth preset value is detected.

In at least one exemplary embodiment, the operation that the motor control signal which is input via the speed control component of the electric vehicle is shielded may include the following operations: in response to determining that a duration for which the predetermination operation lasts exceeds a fifth preset value, the motor control signal which is input via the speed control component of the electric vehicle is shielded.

In at least one exemplary embodiment, after the motor control signal which is input via the speed control component of the electric vehicle is shielded, the method may further include one of the followings: in response to determining that a duration for which the motor control signal which is input via the speed control component of the electric vehicle has been shielded exceeds a sixth preset value and a wheel speed of the electric vehicle is 0, the electric vehicle is locked; and in response to detecting the detection that a duration for which a kickstand of the electric vehicle has been placed down exceeds a seventh preset value, the electric vehicle is locked.

In at least one exemplary embodiment, after the motor control signal which is input via the speed control component of the electric vehicle is shielded, the method may further include at least one of the followings: an indicator lamp of the electric vehicle is controlled to emit light in a predetermined display manner; and the electric vehicle is controlled to make a first predetermined prompt tone, wherein the indicator lamp is located on other positions, except for a position where an instrument is located, on a handlebar of the electric vehicle, or the indicator lamp is located on a handlebar vertical pipe of the electric vehicle.

According to another embodiment of the present disclosure, there is further provided an apparatus for processing a motor control signal, which may include: a detection module, configured to detect a predetermined operation, wherein the predetermined operation includes that a rider leaves an electric vehicle; and a shielding module, configured to shield a motor control signal which is input via a speed control component of the electric vehicle.

In at least one exemplary embodiment, the shielding module may include: a shielding unit, configured to shield, in response to determining that a duration for which the predetermination operation lasts exceeds a fifth preset value, the motor control signal which is input via the speed control component of the electric vehicle.

In at least one exemplary embodiment, the detection module may include a detection unit; and the detection unit is configured to execute at least one of the following operations: that a bearing state at a predetermined position of the electric vehicle is a predetermined state is detected; and that a kickstand of the electric vehicle has been placed down is detected.

In at least one exemplary embodiment, in response to determining that the bearing state at the predetermined position of the electric vehicle is the predetermined state, the detection module is configured to execute at least one of the following operations: that a press-down pressure acting on a seat cushion of the electric vehicle is smaller than or equal to a first preset value is detected; that a press-down pressure acting on a foot rest of the electric vehicle is smaller than or equal to a second preset value is detected; that a pressure value of a tire of the electric vehicle is smaller than or equal to a third preset value is detected; and that a cadence of a pedal of the electric vehicle is smaller than or equal to a fourth preset value is detected.

In at least one exemplary embodiment, the apparatus is further configured to execute, after shielding the motor control signal which is input via the speed control component of the electric vehicle, one of the following operations: in response to determining that a duration for which the motor control signal which is input via the speed control component of the electric vehicle has been shielded exceeds a sixth preset value and a wheel speed of the electric vehicle is 0, the electric vehicle is locked; and in response to determining that a duration for which a kickstand of the electric vehicle has been placed down exceeds a seventh preset value, the electric vehicle is locked.

In at least one exemplary embodiment, the apparatus is further configured to execute, after shielding the motor control signal which is input via the speed control component of the electric vehicle, at least one of the following operations: an indicator lamp of the electric vehicle is controlled to emit lighting in a predetermined display manner; and the electric vehicle is controlled to make a first predetermined prompt tone, wherein the indicator lamp is located on other positions, except for a position where an instrument is located, on a handlebar of the electric vehicle, or the indicator lamp is located on a handlebar vertical pipe of the electric vehicle.

According to another embodiment of the present disclosure, there is further provided an electric vehicle, which may include the apparatus for processing the motor control signal in any one of the foregoing embodiments.

According to a still another embodiment, there is further provided a storage medium; a computer program is stored in the storage medium; and the computer program is configured to execute the operations of any one of the foregoing method embodiments in running.

According to a still another embodiment, there is further provided an electronic apparatus, which may include a memory and a processor; a computer program is stored in the memory; and the processor is configured to run the computer program to execute the operations of any one of the foregoing method embodiments.

Through the present disclosure, since the motor control signal which is input via the speed control component of the electric vehicle is shielded after the detection that the rider of the electric vehicle leaves the electric vehicle, i.e., a function of a P gear is executed automatically, the vehicle uncontrollable condition is prevented due to the fact that the speed control component of the electric vehicle is triggered falsely, and thus the problem that the rider of the electric vehicle forgets to press the P gear or fails to activate the P gear successfully to cause the false operation of the speed control component and thus cause the harm to the electric vehicle or the user or the surrounding environment in the related art is solved; and therefore, the vehicle is prevented from being uncontrollable, and the safety of the electric vehicle or the user or the surrounding environment is guaranteed.

BRIEF DESCRIPTION OF THE DRAWINGS

The accompanying drawings are described here to provide a deeper understanding of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below with reference to the drawings and embodiments in detail. It should be noted that the embodiments of the present disclosure and the characteristics of the embodiments may be combined with each other if there is no conflict.

It is to be noted that, terminologies such as "first" and "second" in the specification, claims and accompanying drawings of the present disclosure are only used to distinguish similar objects, rather than to describe a special order or a precedence order.

In the related art, in a case where when an electric vehicle is used by a rider, the rider may leave the electric vehicle (it may include that the rider leaves a seat cushion of the electric vehicle and may also include that the rider gets off the electric vehicle) and a hand is still on a speed control component and is not loosened in time, the uncontrollable condition of the electric vehicle is occurred easily. In addition, since the setting of a P gear is not supported by habits of users, it is very easy for most users to forget to switch the P gear, or fail to activate the P gear successfully (i.e., the pressing is non-effective because the pressing of the P gear is nonstandard) to cause the uncontrollable condition. An embodiment of the present disclosure provides a solution for automatically implementing a P-gear function. In this embodiment of the present disclosure, whether a rider is on an electric vehicle or not may be judged actively, thereby controlling a speed control component according to an actual condition and thus effectively preventing the problem that the electric vehicle uncontrollable. The present disclosure will be described below in combination with the embodiments.

Figure 1:
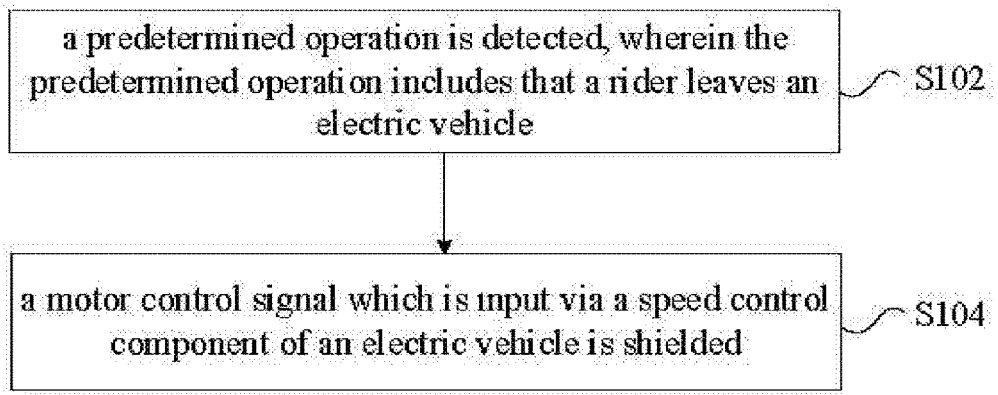
FIG. 1 is a flowchart of a method for processing a motor control signal according to an embodiment of the present disclosure.

An embodiment of the present disclosure provides a method capable of being run on an electric vehicle to process a motor control signal. FIG. 1 is a flowchart of a method for processing a motor control signal according to an embodiment of the present disclosure. As shown in FIG. 1, the flowchart may include the following operations.

In operation S102, a predetermined operation is detected, wherein the predetermined operation includes that a rider leaves an electric vehicle.

In operation S104, a motor control signal which is input via a speed control component of an electric vehicle is shielded.

What executes the above operations may be the electric vehicle (including but not limited to an electric motorcycle, an electric bicycle, a portable electric motorcycle and the like), or a part in the electric vehicle, e.g., one or more processors in the electric vehicle, or one or more other types of modules. The speed control component is a component for controlling a rotational speed of a motor of the electric vehicle, and is, for example, an accelerator handle. Certainly, the speed control component may also be other types of motor rotational speed control components except for the accelerator handle. In this embodiment, the motor control signal is shielded to implement a function of a P gear actually. In addition, it is to be noted that an apparatus for implementing the above operations may completely replace the P gear, i.e., a P-gear button on the electric vehicle may be removed. In at least one exemplary embodiment, in actual application, the apparatus for implementing the above operations may also coexist with the P gear. Specifically, whether to implement the function of the P gear by using the apparatus or to use the P-gear button may be selected by a user, so that the selectivity of the user is increased.

Through the above embodiment, since the motor control signal which is input via the speed control component of the electric vehicle is shielded after the detection that the rider of the electric vehicle leaves the electric vehicle, i.e., the function of the P gear is executed automatically, the vehicle uncontrollable condition is prevented due to the fact that the speed control component of the electric vehicle is triggered falsely, and thus the problem that the rider of the electric vehicle forgets to press the P gear or fails to activate the P gear successfully to cause the false operation of the speed control component and thus cause the harm to the electric vehicle or the user or the surrounding environment in the related art is solved; and therefore, the vehicle is prevented from being uncontrollable, and the safety of the electric vehicle or the user or the surrounding environment is guaranteed.

In an optional embodiment, that the rider leaves the electric vehicle is detected may include at least one of the followings: that a bearing state at a predetermined position of the electric vehicle is a predetermined state is detected; and that a kickstand of the electric vehicle has been placed down is detected (i.e., the kickstand has been placed at a predetermined position for supporting the electric vehicle). In this embodiment, whether or not the rider sits on a seat cushion of the electric vehicle or is still on the electric vehicle may be determined via a force undertaken by the electric vehicle. In at least one exemplary embodiment, it may be appropriate to determine a press-down pressure of the electric vehicle via a pressure sensor, thus determining the bearing state at the predetermined position. As a matter of fact, the above predetermined position may be a plurality of different positions, and may be, for example, a seat cushion, a pedal, a tire (a front tire and/or a rear tire, which may be determined according to a pressure value of the tire) and a foot rest, and may further be a bracket on some part of the electric vehicle (e.g., a bracket for supporting the seat cushion). In response to different detection positions, the sensor may be correspondingly disposed at different positions. For example, the sensor may be mounted below the seat cushion, and certainly may also not be mounted below the seat cushion but is mounted on the foot rest, or on shifters at two sides of a handlebar of the electric vehicle, or on a vehicle body portion in front of the seat cushion, or on a tire, or in the tire, or in a shock absorber, or on several of these above positions, etc. The kickstand may be a one-sided support and may also be a double-sided support, wherein the state of the kickstand may be detected by a Hall sensor.

Figure 2:
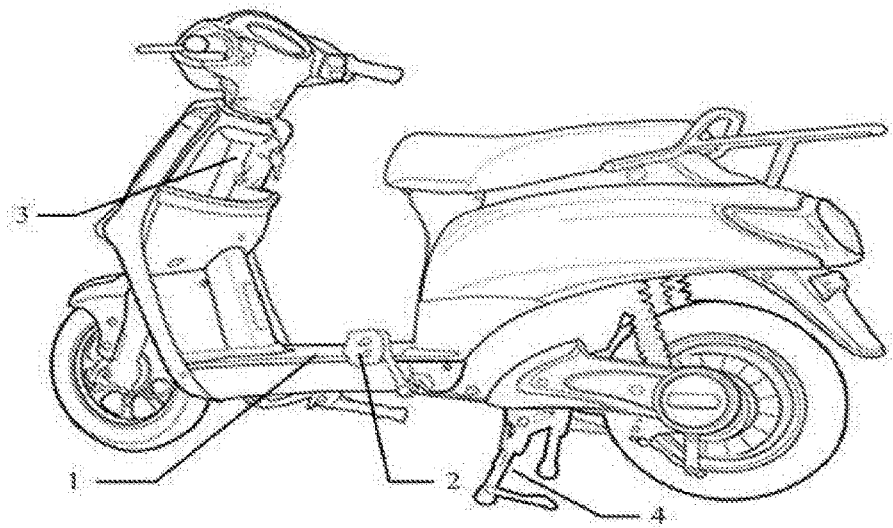
FIG. 2 is a schematic diagram of an electric vehicle and a part of components according to an embodiment of the present disclosure.

In an optional embodiment, that the bearing state at the predetermined position of the electric vehicle is the predetermined state is detected may include at least one of the following operations: that a press-down pressure acting on a seat cushion of the electric vehicle is smaller than or equal to a first preset value is detected; that a press-down pressure acting on a foot rest of the electric vehicle is smaller than or equal to a second preset value is detected; that a pressure value of a tire of the electric vehicle is smaller than or equal to a third preset value is detected; and that a cadence of a pedal of the electric vehicle is smaller than or equal to a fourth preset value is detected (in pedal detection, a cadence sensor may be used for detection). In this embodiment, each of the above preset values may be set flexibly, and may be set flexibly according to a weight of each part of the electric vehicle provided that a preset value at which the rider is not on the electric vehicle can be determined. Furthermore, each preset value may be adjusted appropriately after being set. The above preset values may be adjusted on an Application (APP) or adjusted via an adjustment module by providing the adjustment template on the electric vehicle in advance. The schematic diagram for a part of components of the electric vehicle in this embodiment of the present disclosure may be referred to FIG. 2. Herein, the component numbered as 1 is the foot rest, the component numbered as 2 is the pedal, the component numbered as 3 is the handlebar vertical pipe (it may also be referred to as a handlebar head pipe), and the component numbered as 4 is the kickstand.

In an optional embodiment, the operation that a motor control signal which is input via the speed control component of the electric vehicle is shielded may include the following operations: in response to determining that a duration for which the predetermination operation lasts exceeds a fifth preset value, the motor control signal which is input via the speed control component of the electric vehicle is shielded. In a process when the rider rides the electric vehicle normally, it is possible to adjust a sitting posture for some reason. In this process, the rider may leave the seat cushion temporarily and may sit back on the seat cushion soon. In this case, the real intention of the rider is not to press the P gear obviously but to adjust the sitting posture simply. As a result, the motor control signal which is input via the speed control component of the electric vehicle does not need to be shielded. In order to prevent the above false shielding operation, the shielding operation may be delayed, i.e., in response to determining that the duration of the predetermined operation lasts exceeds the fifth preset value (the fifth preset value is a value enough to determine that the user does not leave the seat cushion temporarily but stops to rise really), the motor control signal which is input via the speed control component of the electric vehicle is shielded. In at least one exemplary embodiment, the fifth preset value may be 5 seconds, 10 seconds and the like. Likewise, the fifth preset value may be set flexibly, and may also be adjusted upon the completion of the setting. The fifth preset value may be set on the APP or adjusted via the adjustment module by providing the adjustment template on the electric vehicle in advance. The specific setting and adjustment manners are not limited.

In an optional embodiment, before the motor control signal which is input via the speed control component of the electric vehicle is shielded, the method may further include the following operation: it is determined that a duration at which the motor control signal input by the speed control component of the electric vehicle is 0 lasts exceeds an eighth preset value. In this embodiment, when the electric vehicle is controlled to enter a motor control shielding state (i.e., the state of the motor control signal input by the speed control component of the electric vehicle is shielded), a value of the current motor control signal may further be considered comprehensively; and when the duration at which the motor control signal is 0 lasts exceeds the eighth preset value, the electric vehicle is re-controlled to enter the motor control shielding state. The main reason for comprehensively considering the value of the current motor control signal lies in that when the rider leaves the seat cushion of the electric vehicle, it is possible to enter a power-assisted pushing mode (in this mode, the electric vehicle needs to keep a certain low-speed operation); and in this mode, shielding the motor control signal directly will cause that the electric vehicle cannot operate at a low speed. Likewise, the above eighth preset value may be set flexibly and may also be adjusted after the completion of setting.

In an optional embodiment, after the motor control signal which is input via the speed control component of the electric vehicle is shielded, the method may further include one of the followings: in response to determining that a duration for which the motor control signal which is input via the speed control component of the electric vehicle has been shielded exceeds a sixth preset value and a wheel speed of the electric vehicle is 0, the electric vehicle is locked; and in response to determining that a duration for which a kickstand of the electric vehicle has been placed down exceeds a seventh preset value, the electric vehicle is locked. In actual application, when the rider leaves the seat cushion of the electric vehicle, it is possible to stop to use the electric vehicle. In this case, the rider needs to press the P gear and lock the electric vehicle manually. However, due to some reasons, after the rider leaves the electric vehicle, the rider may forget to lock the electric vehicle and thus the risk that the electric vehicle is stolen may be caused. In this embodiment, in response to detecting that the duration for which the motor control signal which is input via the speed control component of the electric vehicle is shielded lasts exceeds a certain time and upon the determination that the wheel speed is 0, a vehicle locking operation may be automatically executed, or in response to detecting that the time for which the kickstand is placed down lasts exceeds a preset value, the electric vehicle is locked automatically. The vehicle does not need to be locked manually, so not only is the operation of the user simplified, but the risk that the electric vehicle is stolen is also reduced. Likewise, the above sixth preset value may be set flexibly and may also be adjusted after the completion of setting.

In an optional embodiment, after the motor control signal which is input via the speed control component of the electric vehicle is shielded, the method may further include at least one of the followings: an indicator lamp of the electric vehicle (it may also be referred to a state indicator lamp of the electric vehicle) is controlled to emit lighting in a predetermined display manner; and the electric vehicle is controlled to make a first predetermined prompt tone, wherein the indicator lamp is located on other positions, except for a position where an instrument is located, on a handlebar of the electric vehicle, or the indicator lamp is located on a handlebar vertical pipe of the electric vehicle. In this embodiment, after the motor control signal which is input via the speed control component of the electric vehicle is shielded, it is indicated that the electric vehicle enters a stand-by state (i.e., the electric vehicle is in a power-on state, but the speed control component is in a non-use state, so that the electric vehicle cannot be ridden normally). In this case, the current state may be indicated by controlling the indicator lamp of the electric vehicle to emit lighting and controlling the electric vehicle to make a tone, e.g., it may be appropriate to control the indicator lamp of the electric vehicle to emit lighting to give off yellow light and control the electric vehicle to make two "bang bang" sounds. In addition, it is further to be noted that the different states of the electric vehicle may be indicated by using different display manners of the indicator lamp of the electric vehicle and different sounds made by the electric vehicle. In at least one exemplary embodiment, the different states of the electric vehicle may be indicated only by the different display manners of the indicator lamp of the electric vehicle or only by the different sounds made by the electric vehicle.

In at least one exemplary embodiment, the indicator lamp may be located at one of the following positions of the electric vehicle at least: an inside of a handle of the electric vehicle; an outside of the handle of the electric vehicle; and a position between the inside of the handle and the dash board, wherein the dash board is located at a middle position of the handle of the electric vehicle.

In at least one exemplary embodiment, one or more indicator lamps may be provided.

In at least one exemplary embodiment, the indicator lamp may include: an annular indicator lamp, a semi-annular indicator lamp, a dot matrix indicator lamp and an elongated indicator lamp.

In at least one exemplary embodiment, the display manners of the indicator lamp at least include one of the followings: a display color of the indicator lamp; a display number of the indicator lamps when a plurality of indicator lamps are provided; and a display shape of the indicator lamp.

In addition, it is further to be noted that, in actual application, except for that whether the rider leaves the electric vehicle or not is determined according to the foregoing state of the electric vehicle, other manners may further be used to determine whether the rider leaves the electric vehicle or not, e.g., whether rider leaves the electric vehicle or not may be determined by using an infrared sensor, or using a barometric sensor, or using other types of sensors.

Through the above description of the embodiment, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the present disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the present disclosure.

An embodiment further provides an apparatus for processing a motor control signal. The apparatus is used for implementing the above embodiment and exemplary implementation manners, and contents that have been described will not be repeated. As used herein, the term "module" may implement a combination of software and/or hardware with a predetermined function. Although the apparatus described in the following embodiment is implemented by the software preferably, it may also be conceivable to implement with the combination of the software and the hardware.

Figure 3:
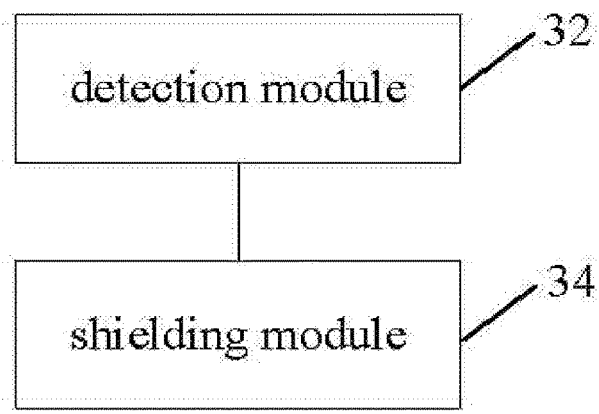
FIG. 3 is a structural block diagram of an apparatus for processing a motor control signal according to an embodiment of the present disclosure.

FIG. 3 is a structural block diagram of an apparatus for processing a motor control signal according to an embodiment of the present disclosure. As shown in FIG. 3, the apparatus may include a detection module 32, and a shielding module 34.

The detection module 32 is configured to detect a predetermined operation, wherein the predetermined operation includes that a rider leaves an electric vehicle; and the shielding module 34 is configured to shield a motor control signal which is input via a speed control component of the electric vehicle.

In at least one exemplary embodiment, the detection module 32 may include: a detection unit, configured to detect that a bearing state at a predetermined position of the electric vehicle is a predetermined state; and detect that a kickstand of the electric vehicle has been placed down.

In at least one exemplary embodiment, the detection module 32 may execute at least one of the following operations: that a press-down pressure acting on a seat cushion of the electric vehicle is smaller than or equal to a first preset value is detected; that a press-down pressure acting on a foot rest of the electric vehicle is smaller than or equal to a second preset value is detected; that a pressure value of a tire of the electric vehicle is smaller than or equal to a third preset value is detected; and that a cadence of a pedal of the electric vehicle is smaller than or equal to a fourth preset value is detected.

In at least one exemplary embodiment, the shielding module 34 may include: a shielding unit, configured to shield, in response to determining that a duration for which the predetermination operation lasts exceeds a fifth preset value, the motor control signal which is input via the speed control component of the electric vehicle.

In at least one exemplary embodiment, the apparatus is further configured to determine, before shielding the motor control signal which is input via the speed control component of the electric vehicle, that a duration at which the motor control signal input by the speed control component of the electric vehicle is 0 lasts exceeds an eighth preset value.

In at least one exemplary embodiment, the apparatus is further configured to execute, after shielding the motor control signal which is input via the speed control component of the electric vehicle, one of the following operations: in response to determining that a duration for which the motor control signal which is input via the speed control component of the electric vehicle has been shielded exceeds a sixth preset value and a wheel speed of the electric vehicle is 0, the electric vehicle is locked; and in response to determining that a duration for which a kickstand of the electric vehicle has been placed down exceeds a seventh preset value, the electric vehicle is locked.

In at least one exemplary embodiment, the apparatus is further configured to execute, after shielding the motor control signal which is input via the speed control component of the electric vehicle, at least one of the following operations: an indicator lamp of the electric vehicle is controlled to emit lighting in a predetermined display manner; and the electric vehicle is controlled to make a first predetermined prompt tone, wherein the indicator lamp is located on other positions, except for a position where an instrument is located, on a handlebar of the electric vehicle, or the indicator lamp is located on a handlebar vertical pipe of the electric vehicle.

According to another embodiment of the present disclosure, there is further provided an electric vehicle, which may include the apparatus for processing the motor control signal in any one of the foregoing embodiments.

It is to be noted that each of the above modules may be implemented via software or hardware, and the later may be implemented via the following manner but is not limited to this: the above modules are located in a same processor; or each of the above modules is located in a different processor in any combined form.

An embodiment of the present disclosure further provides a storage medium; a computer program is stored in the storage medium; and the computer program is configured to execute the operations of any one of the foregoing method embodiments at runtime.

In at least one exemplary embodiment, the storage medium may be configured to store a computer program for executing the following operations.

In operation S1, a predetermined operation is detected, wherein the predetermined operation includes that a rider leaves an electric vehicle.

In operation S2, a motor control signal which is input via a speed control component of an electric vehicle is shielded.

In at least one exemplary embodiment, in this embodiment, the above storage medium may include but not limited to: various media capable of storing the computer program such as a U disk, a Read-Only Memory (abbreviated as ROM), a Random Access Memory (abbreviated as RAM), a mobile hard disk, a magnetic disk or an optical disc.

An embodiment of the present disclosure further provides an electronic apparatus, which may include a memory and a processor; a computer program is stored in the memory; and the processor is configured to run the computer program to execute the operations of any one of the foregoing method embodiments.

In at least one exemplary embodiment, the electric apparatus may further include a transmission device and an input-output device; the transmission device is connected to the processor; and the input-output device is connected to the processor.

In at least one exemplary embodiment, in this embodiment, the processor may be configured to execute the following operations via a computer program.

In operation S1, a predetermined operation is detected, wherein the predetermined operation includes that a rider leaves an electric vehicle.

In operation S2, a motor control signal which is input via a speed control component of an electric vehicle is shielded.

In at least one exemplary embodiment, the specific examples in this embodiment may be referred to the examples described in the above embodiments and optional implementation manners, and will not be repeated here in this embodiment.

Through each of the above embodiments, whether the motor control signal is shielded or not may be judged independently, so that the power-off protection is provided and the speed control component is effectively prevented from being triggered falsely to cause uncontrollability of the electric vehicle. In addition, the operation of the rider may further be reduced, the experience of the user is effectively improved, and the safety of the electric vehicle, the rider and the surrounding environment is guaranteed.

Obviously, those skilled in the art should know that each module or each operation of the present disclosure may be implemented by a universal computing device, and the modules or operations may be concentrated on a single computing device or distributed on a network formed by a plurality of computing devices, and may optionally be implemented by program codes executable for the computing devices, so that the modules or operations may be stored in a storage device for execution with the computing devices, the shown or described operations may be executed in sequences different from those described here in some circumstances, or may form each integrated circuit module respectively, or multiple modules or operations therein may form a single integrated circuit module for implementation.

Therefore, the present disclosure is not limited to any specific hardware and software combination.

The above are only the exemplary embodiments of the present disclosure and are not intended to limit the scope of protection of the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. A method for processing a motor control signal, comprising:
   detecting a predetermined operation, wherein the predetermined operation comprises that a rider leaves an electric vehicle; and
   shielding a motor control signal which is input via a speed control component of the electric vehicle;
   wherein after shielding the motor control signal which is input via the speed control component of the electric vehicle, the method further comprises one of the followings: in response to determining that a duration for which the motor control signal which is input via the speed control component of the electric vehicle has been shielded exceeds a sixth preset value and a wheel speed of the electric vehicle is 0, locking the electric vehicle; and in response to detecting that a duration for which a kickstand of the electric vehicle has been placed down exceeds a seventh preset value, locking the electric vehicle.

2. The method as claimed in claim 1, wherein detecting that the rider leaves the electric vehicle comprises at least one of the followings:
   detecting that a bearing state at a predetermined position of the electric vehicle is a predetermined state; and
   detecting that a kickstand of the electric vehicle has been placed down.

3. The method as claimed in claim 2, wherein detecting that the bearing state at the predetermined position of the electric vehicle is the predetermined state comprises at least one of the followings:
   detecting that a press-down pressure acting on a seat cushion of the electric vehicle is smaller than or equal to a first preset value;
   detecting that a press-down pressure acting on a foot rest of the electric vehicle is smaller than or equal to a second preset value;
   detecting that a pressure value of a tire of the electric vehicle is smaller than or equal to a third preset value; and
   detecting that a cadence of a pedal of the electric vehicle is smaller than or equal to a fourth preset value.

4. A storage medium, wherein a computer program is stored in the storage medium; and the computer program is configured to execute the method as claimed in claim 3 when runs by a processor.

5. A storage medium, wherein a computer program is stored in the storage medium; and the computer program is configured to execute the method as claimed in claim 2 when runs by a processor.

6. The method as claimed in claim 1, wherein the shielding the motor control signal which is input via the speed control component of the electric vehicle comprises:
   in response to determining that a duration for which the predetermination operation lasts exceeds a fifth preset value, shielding the motor control signal which is input via the speed control component of the electric vehicle.

7. The method as claimed in claim 1, wherein after shielding the motor control signal which is input via the speed control component of the electric vehicle, the method further comprises at least one of the followings:
   controlling an indicator lamp of the electric vehicle to emit light in a predetermined display manner, wherein the indicator lamp is located on positions, except for a position where an dash board is located, on a handlebar of the electric vehicle, or the indicator lamp is located on a handlebar vertical pipe of the electric vehicle; and
   controlling the electric vehicle to make a first predetermined prompt tone.

8. A storage medium, wherein a computer program is stored in the storage medium; and the computer program is configured to execute the method as claimed in claim 1 when runs by a processor.

9. An electronic apparatus, comprising a memory and a processor, wherein a computer program is stored in the memory, and the processor is configured to run the computer program to execute the method as claimed in claim 1.

10. An apparatus for processing a motor control signal, comprising a hardware processor, configured to perform programming components stored in a memory, wherein the programming components comprise:
    a detection module, configured to detect a predetermined operation, wherein the predetermined operation comprises that a rider leaves an electric vehicle; and
    a shielding module, configured to shield a motor control signal which is input via a speed control component of the electric vehicle;
    wherein the hardware processor is further configured to execute, after shielding the motor control signal which is input via the speed control component of the electric vehicle, one of the following operations: in response to determining that a duration for which the motor control signal which is input via the speed control component of the electric vehicle has been shielded exceeds a sixth preset value and a wheel speed of the electric vehicle is 0, locking the electric vehicle; and in response to determining that a duration for which a kickstand of the electric vehicle has been placed down exceeds a seventh preset value, locking the electric vehicle.

11. The apparatus as claimed in claim 10, wherein the shielding module comprises:
    a shielding unit, configured to shield, in response to determining that a duration for which the predetermination operation lasts exceeds a fifth preset value, the motor control signal which is input via the speed control component of the electric vehicle.

12. An electric vehicle, comprising the apparatus for processing the motor control signal as claimed in claim 11.

13. The apparatus as claimed in claim 10, wherein the detection module comprises a detection unit, and the detection unit is configured to execute at least one of the following operations:
    detecting that a bearing state at a predetermined position of the electric vehicle is a predetermined state; and
    detecting that a kickstand of the electric vehicle has been placed down.

14. The apparatus as claimed in claim 13, wherein in response to determining that the bearing state at the predetermined position of the electric vehicle is the predetermined state, the detection module is configured to execute at least one of the following operations:
    detecting that a press-down pressure acting on a seat cushion of the electric vehicle is smaller than or equal to a first preset value;

detecting that a press-down pressure acting on a foot rest of the electric vehicle is smaller than or equal to a second preset value;

detecting that a pressure value of a tire of the electric vehicle is smaller than or equal to a third preset value; and detecting that a cadence of a pedal of the electric vehicle is smaller than or equal to a fourth preset value.

15. An electric vehicle, comprising the apparatus for processing the motor control signal as claimed in claim 14.

16. An electric vehicle, comprising the apparatus for processing the motor control signal as claimed in claim 13.

17. The apparatus as claimed in claim 10, wherein the programming component is further configured to execute, after shielding the motor control signal which is input via the speed control component of the electric vehicle, at least one of the following operations:

controlling an indicator lamp of the electric vehicle to emit lighting in a predetermined display manner, wherein the indicator lamp is located on other positions, except for a position where an dash board is located, on a handlebar of the electric vehicle, or the indicator lamp is located on a handlebar vertical pipe of the electric vehicle; and controlling the electric vehicle to make a first predetermined prompt tone.

18. An electric vehicle, comprising the apparatus for processing the motor control signal as claimed in claim 10.

* * * * *